United States Patent [19]

Sawhill

[11] Patent Number: 5,643,622

[45] Date of Patent: Jul. 1, 1997

[54] METHODS FOR PRODUCING A SOLID FEED SUPPLEMENT

[75] Inventor: Wallace Sawhill, Canoga Park, Calif.

[73] Assignee: Pacific Kenyon Corporation, Long Beach, Calif.

[21] Appl. No.: 110,513

[22] Filed: Aug. 23, 1993

Related U.S. Application Data

[63] Continuation-in-part of Ser. No. 58,130, May 10, 1993.

[51] Int. Cl.$^6$ .............................. A23C 21/02; A23J 1/16; A23K 1/06; A23L 1/305
[52] U.S. Cl. .............................. 426/41; 426/42; 426/72; 426/74; 426/520; 426/573; 426/656; 426/657; 426/807
[58] Field of Search .................... 426/42, 573, 2, 426/41, 72, 34, 74, 520, 656, 657, 807

[56] References Cited

U.S. PATENT DOCUMENTS

| | | | |
|---|---|---|---|
| 2,585,951 | 2/1952 | Malkames | 426/41 |
| 3,974,294 | 8/1976 | Schwille et al. | 426/32 |
| 4,143,174 | 3/1979 | Shah et al. | 426/570 |
| 4,234,608 | 11/1980 | Linehan | 426/72 |
| 4,803,085 | 2/1989 | Findley | 426/69 |

FOREIGN PATENT DOCUMENTS

| | | |
|---|---|---|
| 438073 | 1/1972 | Australia. |
| 60878 | 10/1973 | Australia. |
| 170505 | 3/1974 | New Zealand. |
| 1356954 | 6/1974 | United Kingdom. |

OTHER PUBLICATIONS

Gessner G. Hawley, The Condensed Chemical Dictionary 10th Ed., Van Nostrand Reinhold Co, New York, 1981 p. 185.

*Primary Examiner*—Esther Kepplinger
*Assistant Examiner*—Curtis E. Sherrer
*Attorney, Agent, or Firm*—Plante & Strauss

[57] ABSTRACT

There is disclosed a solid animal feed supplement which is prepared in concentrated food industry by-products such as by-products of the dairy industry, such as whey permeates, delactosed whey, and by-products of the fermentation industry, such as whey and corn sweet water. The invention comprises the treatment of the protein-rich by-products with a mild enzymatic treatment which stabilizes the by-products against protein gelation, and the thermal, and/or enzymatic treatment of the lactose-rich by-products to avoid separation of the lactose from concentrates. The by-products can then be concentrated to high solids content, in excess of 50 weight percent, and the resultant concentrates can be treated with gelation agents, preferably phosphoric acid and lime to solidify the by-product. Feed nutrients such as fats, urea, sodium bicarbonate, calcium carbonate, calcium sulfate, etc., or drugs such as monisan, can be added before solidification forming useful solid animal feed supplements.

17 Claims, No Drawings

METHODS FOR PRODUCING A SOLID FEED SUPPLEMENT

BACKGROUND OF THE INVENTION

This application is a continuation-in-part of my copending application, Ser. No. 08/058130 filed May 10, 1993.

1. Field of Invention

This invention relates to animal feed supplements formed as solid gels and containing a substantial quantity of solid feed nutrients.

2. Brief Statement of the Prior Art

Sugar containing by-products of the feed industry such as molasses are commonly used as feed supplements for domestic animals; often added as liquids to the animals' daily feed ration. Phosphates have been added to the supplements as a source of dietary phosphorous, urea has been added to supply non-protein nitrogen, and fats have been included, as described in U.S. Pat. No. 2,793,952. Vitamins have been included in these supplements as described in U.S. Pat. No. 2,807,546. Feed supplements have also been manufactured and, marketed as solid blocks. The earliest blocks were pressed blocks which were formed by compressing mixtures of molasses and dry ingredients.

It is known that solid feed supplements can be obtained by the addition of certain gelling agents to molasses. This practice has resulted in commercial acceptance of "poured chemical blocks". The poured chemical blocks are either soft blocks formulated with lime and phosphoric acid at an acidic pH (3.0 to 6.5) as described in U.S. Pat. Nos. 4,027,043 and 4,160,041, or hard blocks in which the formulation contains substantial amounts of alkaline additives, usually magnesium oxide, as described in U.S. Pat. Nos. 4,431,675; 4,171,385; 4,171,386; and 4,265,916; New Zealand Patent 170505, Australian Patent 438,073; and U.K. Patent 1,356,954. Hard blocks prepared by the methods of the latter patents have pH values from 9.5 to 10.5.

These solid feed supplements are intended for free choice or managed feeding. Unfortunately, in some free choice feeding situations, animals tend to overconsume the highly palatable blocks, and appetite suppressants such as salt are often necessary ingredients. U.S. Pat. No. 4,431,675 discloses that the addition of magnesium oxide to a molasses block formed with calcium oxide and phosphoric acid increases its hardness sufficiently to limit its consumption without using appetite suppressants. The amount of magnesium oxide which must be used to achieve adequate hardness is usually much greater than the amount desired for nutrition, even though magnesium oxide is effective in prevention of grass tetany and acidosis and has been found to increase milk production by dairy cattle. In many applications none of these effects are needed, and in such applications the magnesium oxide is a costly ingredient without any nutritional benefit.

OBJECTIVES OF THIS INVENTION

It is an objective of this invention to provide solid animal feed supplements from by-products of the dairy and fermentation industries.

It is a specific objective of this invention to provide solid animal feed supplements of feed nutrients from dairy by-products such as whey permeates, which heretofore, have presented disposal problems to the dairy industry.

It is also a specific objective of this invention to provide solid animal feed supplements of feed nutrients using yeast concentrates from the fermentation industries, such as whey sweet water and corn sweet water.

It is a further objective of this invention to provide a solid feed supplement containing a high proportion of lactose for use as a dietary supplement for poultry.

Other and related objectives will be apparent from the following description of the invention.

BRIEF STATEMENT OF THE INVENTION

This invention comprises solid animal feed supplement formed from dairy by-products such as whey permeates, delactosed whey, and fermentation by-products such as whey and corn sweet water. The invention also comprises the methods for formation of solid feed supplements from these by-products. These by-products have not been used with any significant success in animal feed supplements, despite their low cost and disposal problems. A major disadvantage to their use is the limited solubility of lactose and proteins in the by-products, and the resultant instability of concentrates of the by-products. Successful solidification methods require that the by-products be concentrated, however the concentrates are unstable because of the limited solubility of lactose and the gelatinous character of the proteins. The invention comprises the treatment of the protein-rich by-products with a mild enzymatic treatment which stabilizes the by-products against protein gelation, and the thermal, and/or enzymatic treatment of the lactose-rich by-products to prevent separation of lactose from concentrates. The stabilized concentrates are pretreated with gelation agents such as clays or gums, preferably phosphoric acid and lime, to form stable liquid gels, which are used to form solid feed supplements. Preferably nutrients are added in the preparation of a complete solid animal feed supplement.

DESCRIPTION OF THE PREFERRED EMBODIMENTS

This invention comprises a solid animal feed supplement which is prepared from whey by-products or from sweet waters, which are by-products from fermentation of corn and whey by-products. Preferably the solid supplement is sufficiently hard and water resistant to limit its consumption for free choice feeding of animals. The solidification of the whey by-products and sweet waters is achieved by the addition of calcium oxide or hydroxide and phosphoric acid with optional amounts of a protein meal, a filler, and magnesium oxide or hydroxide.

The useful by-products are described in the following paragraphs.

USEFUL WHEY BY-PRODUCTS

Whole whey is a dilute solution of lactalbumin, lactose, some fats, and the soluble inorganics from the parent milk. The whey is frequently spray dried to a powder or condensed to about 40 to 60 percent solids, the balance being water, and preserved. A typical analysis is as follows:

TABLE 1

| Composition of a Typical Dried Whey | |
| --- | --- |
| Protein | 12.0% |
| Fat | 0.7% |
| Lactose | 60.0% |
| Phosphorous | 0.79% |
| Calcium | 0.87% |
| Ash | 9.7% |

Delactosed whey results from lactose crystallization from whole whey, and consequently has a greater concentration of protein and ash. A typical analysis of delactosed whey is as follows:

TABLE 2

| Composition of a Typical Delactosed Whey | |
| --- | --- |
| Protein | 24.0% |
| Fat | 1.0% |
| Lactose | 50.0% |
| Ash | 20–25% |
| Salt | 5–7% |

Most delactosed whey is used as an ingredient in milk replacers and other relatively high end value products. There is a significant quantity of this by-product, however, which is not suitable for such end uses, frequently because of low protein or high salt contents. The use of this product in animal feed supplements is hindered as it is impractical to concentrate delactosed whey, as gels are formed in concentrates containing 35 weight percent, or greater, solids. Additionally, the maximum solubility of lactose at ambient temperatures is about 20 weight percent, and lactose crystalizes from delactosed whey when cooled to ambient temperatures.

Whole whey is also treated to recover the milk proteins by membrane filtration which separates the proteins which cannot pass through the membrane. The whey permeate which is produced as a by-product of this treatment has greatly increased lactose and decreased protein contents. The raw permeate is concentrated, usually to 50–55% solids. This concentrate must be stored and handled at elevated temperatures, as its content of lactose exceeds the solubility of lactose at ambient temperatures.

A typical analysis of the permeate (commonly referred to as Permeate 90), on a dry weight basis, is as follows:

TABLE 3

| Composition of a Typical Whey Permeate 90 | |
| --- | --- |
| Protein | 2.0% |
| Fat | 1.0% |
| Lactose | 90.0% |
| Ash | 7.0% |
| Salt | 2.0% |

Lactose is frequently crystallized from Whey Permeate 90, and the liquid remaining is commonly referred to as Whey Permeate 60. This liquid has a solids content of 50–55%, and a composition, on a dry weight basis, as follows:

TABLE 4

| Composition of a Typical Whey Permeate 60 | |
| --- | --- |
| Protein | 10.0% |
| NPN Protein | 8.0% |
| Lactose | 64.0% |
| Ash | 25.0% |
| Salt | 10 0% |

No useful products have previously been prepared from the whey permeate 60, and the disposal of this product presents serious problems to the dairy industry. This by-product has not been accepted for use in animal feed supplements because it cannot be economically concentrated above 50–55% solids. Also, lactose is present in the product in excess of its solubility at ambient temperature, and permeates containing only 50–55% solids must be stored and handled at elevated temperatures.

USEFUL FERMENTATION BY-PRODUCTS

The fermentation industries produce large quantities of by-products rich in yeast proteins. A typical fermentation industry by-product is sweet water which is recovered from the residue remaining after distillation of ethanol. The residue from the distillation is screened to remove solids, and then concentrated to about 30% solids. Further concentration is impractical, as the yeast proteins form objectionable gels at higher concentrations. A typical analysis of sweet water from corn fermentation is as follows:

TABLE 5

| Composition of a Typical Corn Sweet Water | |
| --- | --- |
| Protein | 38–42% |
| Fat & corn oil | 18% |

Whey is also used to manufacture ethanol, and the sweet water remaining from this manufacture has the following typical composition:

TABLE 6

| Composition of a Typical Whey Sweetwater | |
| --- | --- |
| Protein | 19.0% |
| Fat | 1.0% |
| Lactose | 6.0% |
| Ash | 42.0% |
| Salt | 20 0% |
| Lactic Acid | 10.5% |

Disposal of the sweet waters presents a serious problem to the fermentation industries. Although these by-products have high protein contents with desirable amino acid profiles, they have not been accepted for use in animal feed supplements, because of the instability of the proteins upon concentration of the sweetwater.

THE PRETREATMENT METHOD

I have found that any of the aforementioned by-products of the dairy and fermentation industries can be used as the principle ingredient in solid animal feed supplements with appropriate pretreatment of the by-products or modification of the method for preparation of the solid supplement.

For successful solidification, it is essential that the by-products be used at high solids contents, typically from 50 to 70 weight percent. At such concentrations, the proteins and/or sugars in the by-products are unstable, and successful use of the by-products thus requires a pretreatment which will prevent the instability occurring during formation of the solid feed supplement.

The protein rich by-products such as delactosed whey and sweet waters from the fermentation industries can be used as the major ingredient in solid supplements by a mild proteinase treatment, at temperatures from 100° to 150° F. under alkaline conditions, with a pH from 7.5 to 10, in the presence of a protease, e.g., alcalase, at a concentration from 0.05 to 2 weight percent. The treatment is conducted for 2 to 24 hours, sufficient for proteolytic digestion to reduce the viscosity of the liquid to about 1000 to 5000 cps. After treatment, an acid, such as sulfuric or propionic acid, can be added to reduce the pH to a value of 2.5 to 4 to prevent spoilage.

A suitable protease is commercially available as ALCALASE from Novo Nordisk A/S, 2880 Bagsvaerde, Denmark. It is a general purpose protease from Subtilisin A, an endoproteinase, as its major enzyme. It is available in two activity grades; 2.4 L with an activity of 2.4 Anson Units per gram, and 0.6 L with an activity of 0.6 Anson Units per gram.

The whey by-products are concentrated to a solids content of 45 to 60 weight percent. The resultant concentrates are heated to a temperature at which all or most of the lactose is soluble, typically to 150° F. or greater, and a thixotropic gel is formed by incorporating a limited quantity of gelling agents in the hot whey by-product. Useful gelling agents are described hereinafter. After the gelling agent is incorporated in the hot whey by-product, the resultant liquid gel should be cooled slowly, preferably by holding and permitting it to cool to ambient temperature.

I have found that lactose which normally crystalizes and separates as a bottom layer of insoluble crystals from concentrated whey by-products will remain suspended in the gel after it cools to ambient temperatures. The lactose crystals which are formed in the liquid gel, are very small and are dispersed throughout the liquid gel and do not separate as a solid phase. The lactose content of the whey by-products can be increased, if desired, by the addition of lactose crystals. Lactose, recovered by crystalization from whey can be added to the liquid gel, either during or after its formation. The lactose can be added as dewatered or dried crystals or can be added as a wet cake containing from 75 to 90% lactose. The amount of lactose which can be added to the liquid gel can be from 5 to 25 weight percent of the liquid gel. Alternatively, the lactose in the whey by-products can be inverted to galactose and glucol, which have greater solubilities. The inversion is performed at mild conditions, with treatment temperatures from 80° F. to 110° F. for periods from 2 to 36 hours. The inversion is enzymatic, with a suitable lactase enzyme, such as LACTOZYM, which is available from Novo Nordisk, 2880 Bagsvaerd, Denmark. The enzyme is a preparation of $\beta$-galactosidase having an activity of 3000 LAU/ml (1 umol glucose release per minute at standard conditions). The inversion of the lactose also changes the flavor of the whey by-product and increases its sweetness, a change which can be of advantage in some applications, as it increases the palatability of the final product to some animals, such as dogs. The inversion is also beneficial as it avoids lactose intolerance in some animals.

The invention also includes the addition of a soluble bisulfite at trace to minor concentrations to the by-products prior to or during its treatment or heating to inhibit discoloration of the by-product. Brown discoloration can occur in the sweetwater by-products during the enzymatic hydrolysis treatment and in some whey by-products when they are heated sufficiently to solubilize lactose. I have found that this discoloration can be inhibited and effectively precluded by the incorporation of from 0.005 to 1.0, preferably 0.005 to 0.1, weight percent of bisulfide, as a soluble bisulfite salt, e.g., an alkali metal or ammonium bisulfite, or sulfurous acid in the by-product prior to or during the hydrolysis or heating step.

The whey by-products are also preferably stabilized against microbial decomposition by adjusting the pH to no greater than 4.0 by the addition of phosphoric acid. A useful acidity range is from 2.5 to 4.0.

The most preferred treatment comprises pasteurization of the whey by-products prior to treatment to reduce the substantial bacterial colonies which are usually present in the by-products. The pasteurization is performed by conventional pasteurization conditions, typically by heating to, and maintaining the by-product at, 155° F. to 175° F. for a period from 7 to 20 minutes. A preferred treatment is 10 minutes at 160° F., which reduces the bacterial counts between 1/50 to 1/100 of the counts of unpasteurized by-products.

After enzymatic treatment, the enzyme is destroyed by mild heating and/or addition of phosphoric acid to reduce the pH to 2.5 to 4.0, as previously described to stabilize the by-product. The pasteurization of the by-product could be performed after the enzymatic treatment, thereby destroying the enzyme and pasteurizing the by-product in a single step. Preferably, however, the pasteurization is performed prior to enzymatic treatment to reduce the growth of bacteria colonies during the enzymatic treatment.

A preservative such as low molecular weight (2 to 7 carbons) organic carboxylic acids such as benzoic acid, sorbic acid, propionic acid, butyric acid, etc., can also be added in an amount from 0.01 to 1.0 weight percent, preferably from 0.05 to 0.5 weight percent to the treated by-product.

THE GELLING AGENTS

Any of the gelling agents commonly used to prepare feed supplement suspensions from molasses can be used for the gellation pretreatment of the by-products in this invention. This includes expanding lattice clays such as attapulgite, gums such as guar gum, lecithin, and other proprietary products, e.g., GENUZAN gum, available from Hercules Incorporated, PFW Division, Wilmington, Del. These gelling agents are used at concentrations from 0.5 to 5.0 weight percent, preferably from 0.5 to 3.0 weight percent by dry weight of the final feed supplement and are incorporated into the by-product liquid with high shear mixing.

A suitable pretreatment method for use of a clay or gum gelling agent employs an aqueous dispersion of the gelling agent in water, e.g., an aqueous clay dispersion containing about 25 weight percent clay and a polyphosphate dispersant such as sodium pyrophosphate. Similar aqueous dispersions of the gums can also be used. The aqueous dispersion of the gelling agent is then stirred into the whey by-product. This method reduces time and labor and eliminates the need to install a high speed mixer to disperse the clay or gum in the whey by-product. Since the clay is not gelled in the aqueous dispersion a flocculent such as ammonium phosphate and polyphosphate and phosphoric acid is added with clay dispersion to the whey by-product to form a gel, usually after the aqueous clay dispersion has been added.

The preferred gelling agents which are incorporated in the by-products to form stable liquid gels are calcium oxide or hydroxide and phosphoric acid. The calcium oxide is preferably prepared as an aqueous solution of from 10 to 35, preferably about 30, weight percent. Alternatively a solution of calcium hydroxide can be prepared at similar concentrations.

The phosphoric acid which is used is preferably orthophosphoric acid, although acidic salts such as monoammonium dihydrogen orthophosphate can also be used. Polyphosphoric acid can also be used, as that acid is a mixture of orthophosphoric acid, pyrophosphoric acid and tripolyphosphoric acid.

The preferred gelling agents of lime and phosphoric acid are added in amounts sufficient to provide from 0.1 to 2.5 weight percent, each, of calcium and phosphorus, sufficient to form a liquid gel in the whey by-product.

THE PHOSPHATE SOLIDIFYING COMPONENT

The phosphate which can be employed as a solidifying agent in the feed solution can be phosphoric acid or any water soluble salt thereof, with the acid being preferred. Examples of useful phosphate salts include the alkali metal and ammonium salts, e.g., sodium phosphate, potassium phosphate, or ammonium phosphate. The ammonium salts are least preferred, as they tend to release ammonia after solidification. The most preferred agent is phosphoric acid which can be of any commercially available grade from 50 to 98 percent acid. Phosphoric acid is preferred as it reduces the pH of the feed supplement and avoids problems caused by ammoniacal salts. The phosphate agent is employed in the feed solution at a concentration from 1 to 8 weight percent, preferably from 3.0 to about 5.0 weight percent, expressed as P2O5, based on the weight of the feed supplement.

THE CALCIUM SOLIDIFYING COMPONENT

The calcium solidifying agent is calcium oxide or hydroxide. Commercially available lime (calcium oxide) is useful in finely subdivided form, typically 90 weight percent or more passing a 125 mesh screen. The more finely subdivided the lime, the faster that it will hydrate and participate in the solidification reaction. The lime can be slaked by mixing with water prior to addition to the feed solution, or if desired, can be added directly to the aqueous feed solution, depending on the process equipment and controls. The amount of the calcium oxide or hydroxide agent which is employed can be from 1.0 to about 8.0 weight percent, expressed as the oxide, and preferably can be from about 3.0 to about 5.0 weight percent based on the weight of the feed supplement.

THE MAGNESIUM OXIDE INGREDIENT

To those formulations which, in the absence of magnesium oxide produce a block of inadequate hardness, limited amounts of magnesium oxide can be added. When used, magnesium oxide is added in an amount from 2 to about 10.0 weight percent, preferably from 4 to about 8 weight percent, and most preferably from 5 to 6 weight percent of the feed supplement. The magnesium oxide should be finely subdivided, at least 90 weight percent passing a 100 mesh screen, preferably, all passing a 225 mesh screen and, most preferably, all passing a 325 mesh screen. Preferably, the magnesium oxide has an activity of from 5 to about 65 seconds when measured in a standard activity test (citric acid test).

THE PROTEIN INGREDIENT

The feed supplement block can also contain a nitrogen ingredient for the animal's protein requirements. Generally the protein content of the feed supplement block will be from 1 to 35, preferably from 5 to 20, weight percent. Examples of suitable protein ingredients include: dried blood and meat meal from rendering plants, cottonseed meal, soy bean meal, rape seed meal, canola meal, sunflower seed meal, palm kernel oil meal, sesame oil meal, perilla oil meal, dehydrated alfalfa, dried and sterilized animal and poultry manure, fish meal, liquid or powdered egg, fish solubles, cell cream and rabbit pellets. Some or all of the protein can be "by-pass" protein, such as corn gluten meal, blood meal, feather meal, dried brewer's grains, distiller's dried grains, etc.

THE FILLER

In some formulations, a filler can be added to supplement the roughage content of the animals' diet. Useful fillers are food by-products and can be brans, hulls, shells or screenings of grains, seeds, or nuts. These fillers are abundant and include: oat hulls, barley hulls, wheat hulls, almond hulls, almond shells, walnut shells, rye mill run, rye middlings, peanut skins, peanut hulls, rice hulls, rice bran, oat screenings, barley screenings, wheat screenings, wheat middlings, wheat shorts, etc.

Screenings are the foreign material produced during cleaning of grain and seeds, and include light and broken grains and agricultural seeds, weed seeds, hulls, chaff, straw, milldust, sand and dirt. The two designations of screenings which can be used are: grain screenings and mixed screenings. The grain screenings have at least 70 percent light and broken grains, wild buckwheat and wild oats. Mixed screenings contains less than 70 percent of grains.

The fillers have food value, and the following table summarizes the compositions of various available fillers and protein meals which can be used:

| Filler | Crude Protein | Crude Fat | Crude Fiber |
| --- | --- | --- | --- |
| Almond Hulls | 4.4 | 4.0 | 14.0 |
| Barley Bran | 12.5 | 4.3 | 21.3 |
| Barley Middlings | 16.3 | 5.0 | 10.4 |
| Barley Mill Run | 11.7 | 2.8 | 15.7 |
| Bean Hulls, Velvet | 13.4 | 2.2 | 28.2 |
| Corn Gluten Meal | 48.0 | 2.4 | 4.2 |
| Corn, Broom | 10.6 | 4.8 | 5.8 |
| Cottonseed Hulls | 4.3 | 1.0 | 50.0 |
| Cottonseed Meal | 44.8 | 2.3 | 13.0 |
| Cottonseed, Whole | 24.9 | 21.1 | 18.0 |
| Feather Meal | 87.4 | 2.9 | 0.6 |
| Flax Hulls | 8.5 | 1.5 | 31.5 |
| Flax Seed Screenings | 17.3 | 10.9 | 14.2 |
| Grape Pomace, Dried | 12.7 | 7.6 | 33.0 |
| Hops, Spent, Dried | 24.8 | 5.1 | 24.3 |
| Oat Hulls | 3.8 | 1.5 | 32.2 |
| Oat Middlings | 17.4 | 6.4 | 3.2 |
| Oat Mill By-Product | 6.1 | 2.1 | 29.4 |
| Oat Mill Feed | 3.1 | 1.1 | 35.1 |
| Oat Shorts | 14.1 | 6.1 | 14.8 |
| Peanut Skins | 17.4 | 2.5 | 12.6 |
| Rice Bran | 13.0 | 13.0 | 13.0 |
| Rice By-Product | 6.7 | 5.6 | 33.0 |
| Rice Hulls | 3.1 | 0.9 | 44.5 |
| Rice Middlings | 15.6 | 6.8 | 9.6 |
| Rye Middlings | 18.4 | 3.8 | 5.8 |
| Rye Mill Run | 18.5 | 3.7 | 5.1 |
| Safflower Seeds | 19.5 | 32.0 | 31.0 |
| Screenings | 14.2 | 5.2 | 13.1 |
| Soybean Hulls | 12.4 | 2.8 | 36.1 |
| Soybean Meal | 49.6 | 1.4 | 7.0 |
| Soybean Mill Run | 13.6 | 1.4 | 40.7 |
| Wheat Bran | 18.0 | 5.0 | 11.0 |
| Wheat Chaff | 5.5 | 1.7 | 32.2 |
| Wheat Middlings | 19.9 | 5.7 | 8.9 |
| Wheat Mill Run | 17.0 | 4.8 | 9.0 |
| Wheat Shorts | 18.1 | 5.5 | 7.3 |
| Wheat Screenings | 13.6 | 4.3 | 10.2 |
| Buckwheat Hulls | 5.0 | 1.0 | 44.0 |
| Peanut Hulls | 6.0 | 1.0 | 60.0 |

THE FAT INGREDIENT

An animal-edible fat can be incorporated in the solid feed supplement as an energy source. Useful animal edible fats are the edible fats and oils from animal and vegetable sources. The supplement prepared by the method of the invention can contain up to about 15 weight percent, based on the supplement weight, of edible fat. Preferably, the composition has from 2 to about 12 weight percent fat. These fats are mono, di- or tri-glycerides of various fatty acids such as stearic, palmitic, oleic, linoleic, lauric, etc. Useful fats and oils can also include complex lipids such as the phospholipids, e.g., fatty acid esters of glycerol phosphate or lecithin, which also contain nitrogen bases such as choline. The fats are commonly identified by source, and suitable fats which can be employed include the oils, tailings or residues of the following: soy bean oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2, 6-3,di-tert-butylphenol, etc.

Normally solid animal edible fats are the most widely available and are preferred. These fats have high melting points in excess of ambient temperatures, i.e., in excess of 65°–80° F. The solid fat is heated sufficiently to melt the fat and the resultant, hot fat liquid is then added to the mixture of feed ingredients and gelling agents while stirring the mixture sufficiently to disperse the fat intimately through the mixture. No emulsifying or stabilization agent is necessary, for if the fat is adequately dispersed into the mixture, the fat subdivides into small particles which solidify and are thoroughly dispersed throughout the solid product. Acidulated fats, which can have free fatty acid contents of 40% to 70% can also be used. These fats are often liquid at room temperatures.

The fat can be added to the supplement during the solidification steps, preferably after the solidifying additive, e.g., lime and phosphoric acid, has been added. Alternately, when the feed solution is pretreated to form a liquid gel suspension, up to 50 weight percent fat can be added to the suspension by adding it in the previously described manner to the liquid gel during its formation. In this manner, greater amounts of fat can be incorporated in the solid supplement than if the fat is added during the solidification steps.

PROTEIN EQUIVALENT INGREDIENTS

When the feed supplement is intended for consumption by ruminants, a non-protein nitrogen compound such as urea, biuret or mono or de-ammonium phosphate can be used to supply the protein nitrogen dietary requirements of the animals.

Generally, the feed supplement should not contain more than 40 weight percent of its protein as equivalent protein from a non-protein nitrogen compound. A typical ruminant feed would, therefore, contain from 5 to about 15, preferably from 7 to about 12 weight percent urea as a source of non-protein nitrogen.

OTHER FEED INGREDIENTS

Other feed ingredients which can also be added to the supplement include ammonium sulfate, sodium chloride or potassium chloride in an amount from 0.5 to 15 weight percent of the supplement. When lactose is thoroughly dispersed in the solid feed supplement by use of a pretreated liquid gel in which lactose crystals are suspended, the water activity of the supplement is reduced sufficiently to inhibit spoilage. The resistance to spoilage can be enhanced by adding microicides such as propionic acid, benzoic acid, or sodium bisulfite to stabilize the supplement against bacteria and yeasts. In those applications, propionic acid at a concentration of 0.1 to 0.5 weight percent, or sodium bisulfite at a concentration of 0.5 to 1.0 wight percent are effective in preventing growth and development of bacteria and mold.

The content of minerals, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as and sodium , commercially available under the designation RUMENSIN from Eli Lilly Co.; chlorotetracyline and sulfamethiazine; and mixtures of chlorotetracyline and sulfamethiazine; etc. Other useful drugs include anti-bloat and anthelmintic agents as well as insect control agents. The aforementioned materials are used in effective concentrations for the desired result, e.g., drugs are used at concentrations from 0.1 to about 1.0 weight percent. The minerals are usually used in similar concentrations, but are often expressed in amounts from 3 to about 500 milligrams per pound and vitamins are frequently expressed from 10 to about 50,000 units per pound.

THE SOLIDIFYING METHOD

The solid feed supplement is prepared from the aforementioned pretreated whey by-products or corn or whey sweetwaters which are used as the only, or principal solidifying feed ingredient, i.e., at least 85 percent, and preferably at least 95 percent, of the solidifying feed ingredients is a whey by-product or corn or whey sweetwater. The solidifying feed ingredient is the sugar and/or protein containing ingredient which is solidified upon addition of the solidifying agent. As used herein, solidifying feed ingredient is not intended to include additional feed nutrients such as protein meals, fillers, fat, etc.. The order of addition of the various feed ingredients and solidification agents isn't critical, however, the following procedure is preferred.

The lime is prepared as an aqueous slurry by mixing lime or hydrated lime with water to prepare a slurry containing from 20 to 70 weight percent CaO. This slurry is admixed with the pretreated whey by-product or sweetwater, phosphoric acid is added, magnesium oxide is added if needed, and the additional feed nutrients such as protein meals, fillers, fat, etc. are added.

The feed ingredients and solidifying agents are mixed at temperatures from about 100° F. to 140° F. The ingredients are added at ambient temperatures, and the exothermic heat of reaction will raise the temperature of the supplement to the desired temperature. In some preparations, cooling may be necessary and it is therefore preferred to mix the ingredients in a vessel surrounded by a jacket through which cooling water can be circulated.

The supplement mix is poured into product containers, e.g., cardboard boxes, plastic tubs, etc., or molds of metal, cardboard or plastic. The mix should be poured within 0 to 60 minutes of its preparation, usually within 15 to 30 minutes, to avoid the possibility that the mix will solidify within the mixing vessel.

The supplement will solidify in the product containers or molds within 2 to 12 hours after it has been prepared. Typically the containers or molds are stored overnight under controlled temperatures to achieve the desired hardness of the solid supplement, with heating or cooling as required to maintain the temperature of the solids between 125° and 135° F.

Example 1

The following experiments will illustrate the treatment of sugar and protein containing by-products and the preparation of stable liquid suspensions suitable for preparation of solid feed supplements.

The following by-products are treated:

|  | Corn Sweet Water (CSW) | Delactosed Whey (DW) |
|---|---|---|
| Protein | 12.0% | 8.5% |
| Fat | 5.5% | 0.4% |
| Sugars |  | 17.5% |
| Ash |  | 7.0% |
| Salt |  | 2.0% |
| Solids Content | 30.0% | 35.0% |

A blend of equal volumes of corn sweet water and delactosed whey was also prepared and used in the experiments. Each of the three liquid by-products was treated enzymatically as follows:

The pH of each liquid was adjusted to 7.5 by the addition of sodium hydroxide, when necessary, and 0.1 weight percent of ALCALASE (2.4 L standardized solution) was added. The resultant solutions were heated to 125° F. and maintained at that temperature for 12 hours.

The solutions are concentrated after the enzymatic treatment by vacuum evaporation at 160° F. and 60 millimeters Hg pressure. As the enzyme is deactivated when heated to 160° F. or above for several minutes, the concentration step also stops further enzymatic action. The resultant liquids had the following concentrations: CSW: 52%; Blend: 56%; and DW: 51%, all expressed as weight percent solids.

Liquid suspensions were prepared from the treated liquid by-products. The following table summarizes the ingredients in parts by weight which were used to prepare the liquid suspensions:

| Ingredients | 1 | 2 | 3 |
|---|---|---|---|
| Water | 10 | 10 | 10 |
| Hydrated Lime | 5 | 5 | 5 |
| Liquid By-Product | 200 | 200 | 200 |
|  | (CSW) | (BLEND) | (DW) |
| Propionic Acid | 1 | 1 | 1 |
| Phosphoric Acid (75%) | 20 | 20 | 20 |

The procedure followed in all examples was to dissolve hydrated lime in water, mix the lime solution with the liquid by-product, and add phosphoric acid, and a preservative, usually propionic acid, to stabilize the suspensions against microbial activity. The ingredients were mixed in a laboratory mixer at moderate speed which varied from 200 to 1000 rpm as required by visual observation of the mixing. The final pH values of the suspensions were 4.0 to 4.1 and exhibited the following viscosities:

| pH | pH 7 | pH 4 |
|---|---|---|
| CSW | 6000 cps | 1200 cps |
| DW | 3000 cps | 1500 cps |
| BLEND | 12000 cps | 1800 cps |

The suspensions were stable and thixotropic and suitable for solidification by the addition of lime and phosphoric acid during the solidification method of the invention.

Other feed nutrients can be added to the suspensions, such as fat, protein meals, calcium carbonate, etc., in amounts up to 30–35 weight percent, without experiencing instability or excessive viscosities.

Example 2

A concentrated by-product, Permeate 60, was processed to prepare a stable suspension with a viscosity suitable for manufacture of a solid feed supplement. The by-product had the following composition on a dry basis:

| protein | 10.0% |
|---|---|
| lactose | 64.0% |
| ash | 25.0% |
| salt | 10.0% |

The by-product had a concentration of 50 weight percent solids and approximately 10 weight percent lactose crystals settled from the liquid when standing at room temperature. The by-product was heated to 110° F.–115° F. to dissolve all the lactose, and an aqueous solution of hydrated lime (2 parts) in water (3 parts) was added to 400 parts of the by-product. The pH of the resultant mixture was 10. Fifteen parts of 75% phosphoric acid as added, sufficient to reduce its pH to 4.0, and 2 parts propionic acid was added to the resultant liquid gel.

After storage at room temperature for 24 hours, the liquid gel was inspected and found to be stable, without any sediment or settled lactose crystals and was a thixotropic liquid with a viscosity of 3000 cps. Inspection a week later revealed that the liquid gel was unchanged.

Example 3

A sample of sweet water concentrate from whey fermentation was treated to obtain a stabilized liquid gel which is suitable for solidification by the method of this invention. The sweet water concentrate had the following composition:

|  | Percent (dry basis) |
|---|---|
| Protein | 18% |
| Sugar | 10% |

The concentrate had 30 percent solids content. Sufficient sodium hydroxide was added to raise the pH of the concentrate to 8.0, and 0.1 weight percent proteinase (alcalase) was added and the resultant solution was heated to and maintained at 125° F. for two days.

After the second day, the liquid was concentrated to 52 weight percent solids by vacuum evaporation to yield a stable liquid having a viscosity of 2100 cps.

Example 4

A whole whey solution (4300 grams) containing 32 weight percent lactose, 6.4 weight percent protein and 53 weight percent solids was treated enzymatically by adding sufficient sodium hydroxide to raise its pH to 8.0, four milliliters of ALACASE 2.41 was added and the mixture was heated to and maintained at 110° F. overnight. The viscosity of the whey was measured before treatment and found to be 2100 cps, and after treatment to be 100 cps, indicating that the proteins had been fragmented sufficiently to destroy their gelling tendencies. The whey was then tested to determine the solubility of lactose at various temperatures. Samples of 200 milliliters of the whey were stored at temperatures of 35°, 110° and 170° F. and inspected for viscosity and volume of precipitate. The data were as follows:

| Temperature (°F.) | 35 | 70 | 110 | 170 |
|---|---|---|---|---|
| Viscosity (cps) | 100 | 100 | 100 | 100 |
| Vol. of precipitate (%) | 27 | 17 | 3 | 0 |

The precipitates in the samples were chiefly lactose crystals which had a coarse grainy appearance and feel.

The treated whey was then heated to 170° F. and 200 gram samples were processed into stable suspensions using the following gelatin additives: ammonium polyphosphate (10-34-0), 10-34-0 hydrated lime, orthophosphoric acid, orthophosphoric acid and hydrated lime, gums (GENSUAN 1063 and GENSUAN 1038), attapulgite clay and MINUGEL (clay). The following table summarizes the ingredients:

| Ingredient | Control | 2 | 3 | 4 | 5 | 6 | 7 | 8 | 9 |
|---|---|---|---|---|---|---|---|---|---|
| Whey | 200 | 200 | 200 | 200 | 200 | 200 | 200 | 200 | 200 |
| 10-34-0 | 0 | 10 | 0 | 10 | 0 | 0 | 0 | 0 | 0 |
| Orthophosphoric Acid | 0 | 0 | 10 | 0 | 10 | 0 | 0 | 0 | 0 |
| Lime 67% solution | 0 | 0 | 0 | 10 | 0 | 0 | 0 | 0 | 0 |
| Lime 67% solution | 0 | 0 | 0 | 0 | 10 | 0 | 0 | 0 | 0 |
| GENSUAN 1063 | 0 | 0 | 0 | 0 | 0 | 2 | 0 | 0 | 0 |
| GENSUAN 1038 | 0 | 0 | 0 | 0 | 0 | 0 | 2 | 0 | 0 |
| Attipulgite clay | 0 | 0 | 0 | 0 | 0 | 0 | 0 | 6 | 0 |
| MINUGEL | 0 | 0 | 0 | 0 | 0 | 0 | 0 | 0 | 6 |

The samples were permitted to cool to room temperature and were tested for pH value, viscosity at rest, stirred viscosity, and for volume of precipitate after standing for 24 hours. The following table summarizes the results:

| | Control | 2 | 3 | 4 | 5 | 6 | 7 | 8 | 9 |
|---|---|---|---|---|---|---|---|---|---|
| pH | 7.4 | 4.5 | 6.5 | 5.2 | 8.8 | 7.0 | 7.0 | 6.8 | 6.9 |
| Viscosity (1000 cps) | | | | | | | | | |
| at rest | 0.1 | 1.8 | 2.1 | 30 | 26 | 18 | 10 | 18 | 25 |
| stirred | — | 0.1 | 0.6 | 0.5 | 18 | 8 | 4.5 | 1.8 | 10 |
| Precipitate | yes | no | no | no | no | no | no | no | no |

It was observed that all the gelling agents effectively prevented separation of lactose crystals and formed thixotropic suspensions of very fine crystals. In the control sample the lactose crystals formed as large, sand-like solids which precipitated. In the samples containing the gelling agents, the lactose crystals which formed were very small and remained suspended.

The whey suspensions obtained in the experiment can be solidified by the invention to prepare solid feed supplements and other feed nutrients such as fat, calcium carbonate, calcium phosphate, etc., can be added as desired.

The following examples will illustrate the solidification of various pretreated whey and fermentation by-products to form solid feed supplements.

Example 5

Solids were prepared from whey by-products which had been pretreated to form stable liquid gels in which lactose crystals were suspended. The whey by product was Permeate 90 and separate samples were pretreated as described in Example 4 to form liquid gels by the addition of lime and phosphoric acid, clay (MINUGEL) and gum (GENSUAN). Two controls were also solidified which were: a decanted liquid phase from permeate 90 (12 percent lactose), and a permeate 90 stirred sufficiently to disperse lactose crystals (90 percent lactose). The following table summarizes the formulation for each sample:

| | Block Formulas (quantities in grams) | | | | |
|---|---|---|---|---|---|
| Ingredients | #1 (stirred) | #2 (decanted) | #3 | #4 | #5 |
| Water | 50 | 50 | 50 | 50 | 50 |
| Hyd Lime | 40 | 40 | 40 | 40 | 40 |
| Perm 90#1 | 660 | — | — | — | — |

-continued

| | Block Formulas (quantities in grams) | | | | |
|---|---|---|---|---|---|
| Ingredients | #1 (stirred) | #2 (decanted) | #3 | #4 | #5 |
| Control Perm 90#2 | — | 660 | — | — | — |
| Control Perm 90 + Lime/Phos | — | — | 660 | — | — |
| Perm 90 + Clay | — | — | — | 660 | — |
| Perm 90 + Gum | — | — | — | — | 660 |
| Phos Acid | 40 | 40 | 40 | 40 | 40 |
| MgO | 30/40/50 | 30–50 | 30–50 | 30–50 | 30–50 |
| Bran | 150 | 150 | 150 | 150 | 150 |
| Totals | 980 | 980 | 980 | 980 | 980 |

The solids were prepared by adding a suspension of 40 grams hydrated lime in 50 grams of water to a 660 gram sample of each whey by-product. After the lime suspension was stirred into the whey by-product, 40 grams of phosphoric acid (85%) were added.

Each sample was divided into three equal volumes and magnesium oxide was added in amounts sufficient to provide 3.0, 4.0 and 5.0 weight percent in the final mixture. To each of the resultant mixtures, sufficient bran was added to provide 15 weight percent bran in the final samples.

After the bran had been added, the samples were poured into laboratory beakers lined with plastic bags. The temperature of the samples as poured into the beakers were measured and the samples were inspected for hardness after 5 days. The following table summarizes the results.

|  | #1 (stirred) | #2 (decanted) | #3 lime/acid | #4 clay | #5 gum |
|---|---|---|---|---|---|
| Pour Temp | 120 | 117 | 122 | 118 | 115 |
| Viscosity |  |  |  |  |  |
| 5 Day Hardness |  |  |  |  |  |
| Hard Tester |  |  |  |  |  |
| 3% MgO sample | 5 | 12 | 12 | 8 | 9 |
| 4% MgO sample | 10 | 14 | 18 | 10 | 10 |
| 5% MgO sample | 12 | 18 | 24 | 12 | 12 |
| Soft Tester |  |  |  |  |  |
| 3% MgO sample | 20 | 42 | 62 | 50 | 40 |
| 4% MgO sample | 40 | 50 | 70 | 52 | 40 |
| 5% MgO sample | 52 | 62 | 75 | 58 | 50 |

The hard and soft testers used were laboratory durometer designed to measure the penetration hardness of rubber and rubber-like materials. The hard tester has the standard probe, approximately 1.5 mm in diameter and the soft tester has a probe which is 5 mm in diameter.

All the solids prepared from the stable suspensions, samples 3, 4 and 5 had sufficient hardness for acceptable products, and the sample prepared from the lime/phosphoric acid suspension (#3) had sufficient hardness with 5% magnesium oxide for free choice feeding of cattle. The samples 1, 3, 4 and 5 contained approximately 34 percent lactose. Sample 2 contained 8 percent lactose.

Each of the solids obtained with 3% magnesium oxide were sampled and the samples were diluted 100, 10,000 and $1 \times 10^6$ times. Samples of each dilution were placed in culture media and stored for one week. Bacteria counts were made on the innoculated media and the following table summarizes the results in number of colonies per gram of solid:

|  | 1 | 2 | 3 | 4 | 5 |
|---|---|---|---|---|---|
| Bacteria count | 20,000 | 400,000 | 40,000 | 50,000 | 40,000 |

The bacteria counts of samples 1, 3, 4 and 5 were approximately equal within the accuracy of the test. Sample 2, however, exhibited a much higher bacteria count, a result of the much lower lactose content and greater water activity of the solid.

Example 6

An experiment was performed to determine if solids could be prepared which contained greater contents of lactose than the solids prepared in Example 5 (34 percent lactose). In this experiment finely subdivided lactose crystals (80 percent lactose) were added to a lime/phosphoric acid suspension prepared from permeate 90 as described in Example 4. Five solids were prepared having the following pH value and lactose contents:

| Sample | 1 | 2 | 3 | 4 | 5 |
|---|---|---|---|---|---|
| pH | 7.0 | 4.2 | 7.0 | 7.0 | 7.0 |
| Lactose (%) | 34 | 34 | 37 | 42 | 47 |

Samples were taken from each solid and diluted 100, 10,000 and $1 \times 10^6$ times. Samples of each dilution were placed in culture media and counts of bacteria colonies were made after one week at ambient temperature. The following bacteria counts were obtained:

|  | #1 | #2 | #3 | #4 | #5 |
|---|---|---|---|---|---|
| Bacteria per gram | 30,000 | 25,000 | 15,000 | 45,000 | 1,000 |

The data indicate that bacteria growth is greatly inhibited when the lactose content is 47 weight percent, reflecting the decreased water activity of the sample.

Example 7

A solid feed supplement is prepared from Permeate 60 in full scale plant production with a batch vessel 6 feet high and 6 feet in diameter, having a 35° conical bottom. The exterior side and bottom walls of the tank are surrounded by a cooling jacket. The tank is equipped with a four blade paddle mixer approximately at its midline, and a second four blade paddle mixer adjacent its bottom. A cooling coil of 4 inch diameter pipe rolled into a 48 inch outside diameter coil with an 8 inch pitch is supported in the tank, above the bottom paddle mixer and surrounding the upper paddle mixer.

The Permeate 60 is heated to 170° F. and 7500 pounds are introduced into the vessel. Cooling water at 75° F. is circulated through the coil and jacket, and 1000 pounds of an aqueous slurry of 50 weight percent hydrated lime is added, followed by the addition of 400 pounds of 85% orthophosphoric acid and 500 pounds of powdered magnesium oxide. The lime, acid and magnesium oxide are added slowly over twenty five minutes while the mixture is stirred at 25 rpm. The rate of addition is controlled to provide sufficient time for removal of the exothermic heat release (approximately 27000 BTUs per ton) exhibited by the addition of these reactants.

Thereafter 600 pounds of rice bran and 10 pounds of trace minerals and vitamin mixture were added, and the mixture was stirred for an additional 20 minutes while cooling to reduce the temperature of the mixture to 140° F.

The mixture is poured into cardboard boxes of 250 pound capacity and stored in a warehouse overnight. Air is circulated over the boxes to maintain the temperature of the supplement below 160° F. The supplement solidifies overnight to a solid state having a hardness, measured with the hard tester, and is suitable for free choice feeding of range cattle.

Example 8

A solid supplement is prepared from 660 grams of Permeate 60. A sample of 100 milliliters of clear liquid is decanted from the sample into a Waring blender. Three grams of MINUGEL, an expanding lattice clay, are added and the mixture is blended by high speed shearing in the blender for 3 minutes to form a clay gel. The remainder of the Permeate 60 sample is added to a one liter stainless steel beaker and heated to 175° F. to dissolve all lactose crystals, and the clay gel is added with stirring. The beaker is placed in a water bath to cool the mixture while eighty grams of ammonium polyphosphate and one hundred grams of magnesium oxide are added slowly while stirring and cooling to remove the exothermic heat of reaction and to reduce the temperature of the mixture to 135° F. Sixty grams of rice bran are also added and the mixture is poured into glass laboratory beakers lined with plastic film. The filled beakers are covered and placed in forced air ovens controlled at 125° F. After several hours the supplement solidifies in the beakers and the solids are inspected and found to have hardness values of 58–65 when tested with a laboratory durometer.

Example 9

A sample of 500 grams Permeate 90 is heated to 175° F. in a one liter stainless steel beaker and mixed with 5 grams hydrated lime and 5 grams phosphoric acid and cooled to 70° F. to form a stable suspension of finely divided lactose crystals. Forty grams of a 50% aqueous suspension of hydrated lime are added with stirring for 10 minutes and the temperature observed to rise to 90° F. The mixture has a pH of 10.0. Two hundred fifty grams of chicken meal are added to the mixture while stirring. Then the pH is lowered to 5.0 to 5.5 by the addition of 75% phosphoric acid, approximately 40 grams. The temperature of the mixture is observed to rise to 112° F. The mixture is stirred and poured into laboratory glass beakers lined with plastic and permitted to cool slowly to ambient temperature over night, resulting in soft solids having hardness values of 50 to 80 when tested with the large diameter probe durometer.

The invention has been described with reference to the illustrated and presently preferred embodiment. It is not intended that the following claims be limited to the illustrated embodiments, but rather that the invention be defined by the steps and conditions, and their obvious equivalents set forth in the following method claims, and the ingredients and their obvious equivalents set forth in the following product claims.

What is claimed is:

1. A method for the preparation of a solid animal feed supplement which comprises: processing a whey by-product comprising a supersaturated aqueous solution of lactose containing from 40 to 60 weight percent solids comprising lactose and protein in excess of 5 weight percent and sufficient to form protein gels by:
    a. treating said whey by-product with a proteinase at conditions sufficient to digest said protein and prevent the formation of protein gels, and heating said aqueous solution to a temperature above 160° F. and sufficient to dissolve all the lactose and form an aqueous solution,
    b. adding a gelling agent selected from the group consisting of expanding lattice clays and a phosphate or phosphoric acid flocculating agent, gums, orthophosphate salts and mixtures of calcium oxide or hydroxide and phosphoric acid to the aqueous solution in an amount sufficient to form a liquid mixture which will solidify upon standing;
    c. adding from 2 to 10 weight percent magnesium oxide to said liquid mixture; and
    d. cooling said liquid mixture to maintain its temperature less than 165° F.; and
    e. pouring said liquid mixture into containers for solidification.

2. The method of claim 1 wherein said gelling agent is a mixture of phosphoric acid and lime.

3. The method of claim 2 wherein said phosphoric acid and lime are incorporated in said aqueous solution at a concentration from 3 to 5 weight percent each, expressed as phosphorus and calcium.

4. The method of claim 1 wherein said aqueous solution is heated to a temperature of 100° F. to 150° F. and maintained at that temperature during treatment with said proteinass.

5. The method of claim 1 including the step of incorporating a solid protein nutrient in an amount up to 35 weight percent in said mixture prior to solidification.

6. The method of claim 5 wherein said solid animal feed nutrient is a protein meal.

7. The method of claim 1 including the step of incorporating a non-protein nitrogen compound in said mixture.

8. A method for the preparation of a solid animal feed supplement which comprises:
    a. heating a whey by-product comprising a supersaturated aqueous solution of lactose containing from 40 to 60 weight percent solids to a temperature less than 200° F. and above that sufficient to dissolve all the lactose;
    b. adding a gelling agent selected from the group consisting of expanding lattice clays and a phosphate or phosphoric acid flocculating agent, gums, orthophosphate salts and mixtures of calcium oxide or hydroxide and phosphoric acid to the aqueous solution in an amount sufficient to form a liquid gel to the aqueous solution of lactose at the aforesaid temperature; and
    c. cooling said liquid gel to ambient temperature to obtain a thixotropic suspension of non-agglomerated lactose crystals dispersed in said liquid gel;
    d. forming a solid from said thixotropic suspension by mixing from 2 to 10 weight percent magnesium oxide in said suspension while maintaining the temperature of the mixture less than 165° F.; and pouring said thixotropic mixture into containers for solidification.

9. The method of claim 8 wherein said gelling agent is a mixture of phosphoric acid and lime.

10. The method of claim 8 including the step of adding phosphoric acid and lime to said suspension to increase its content of lime and phosphoric acid to 3 to 5 weight percent each, expressed as phosphorus and calcium.

11. The method of claim 8 wherein said aqueous solution also contains protein in excess of 5 weight percent and in sufficient amount to form protein gels which precipitate from said solution at ambient temperature, including the step of treating said solution with a proteinase at conditions sufficient to digest said protein and prevent the formation of said protein gel.

12. The method of claim 11 wherein said aqueous solution is heated to a temperature of no greater than 150° F. and maintained at that temperature during digestion.

13. The method of claim 12 wherein said proteinase is used at a concentration of 0.005 to 2 weight percent at a pH from 7.5 to 10.

14. The method of claim 8 including the step of incorporating a solid protein nutrient in said mixture in an amount up to 35 weight percent in said thixotropic suspension.

15. A method for the preparation of a solid animal feed supplement from a fermentation by-product comprising an aqueous solution containing protein in excess of 5 weight percent and in sufficient amount to form protein gels in said solution at ambient temperature, which method comprises:
    a. heating said solution to a temperature from 100° to 150° F. and treating said solution with a proteinase at conditions sufficient to digest said protein and prevent the formation of a protein gel;
    b. adding a gelling agent selected from the group consisting of expanding lattice clays, gums, orthophosphate salts and mixtures of calcium hydroxide and phosphoric acid to the aqueous solution in an amount sufficient to solidify said solution; and
    c. pouring said mixture into containers for solidification and cooling said mixture to ambient temperature.

16. The method of claim 15 wherein said gelling agent is a mixture of phosphoric acid and lime.

17. The method of claim 16 wherein said phosphoric acid and lime are incorporated in said aqueous solution at a concentration from 3 to 5 weight percent each, expressed as phosphorus and calcium.

* * * * *